United States Patent [19]

Ohi

[11] Patent Number: 4,642,699
[45] Date of Patent: Feb. 10, 1987

[54] METHOD OF SCANNING AND RECORDING IMAGES

[75] Inventor: Michio Ohi, Kusatsu, Japan

[73] Assignee: Dainippon Screen Mfg. Co., Ltd., Kyoto, Japan

[21] Appl. No.: 742,543

[22] Filed: Jun. 7, 1985

[30] Foreign Application Priority Data

Jun. 20, 1984 [JP] Japan ................. 59-126910

[51] Int. Cl.⁴ .............................. H04N 1/40
[52] U.S. Cl. .................... 358/280; 358/285; 358/293; 358/294
[58] Field of Search ............... 358/285, 293, 294, 256, 358/280, 282, 286

[56]  References Cited

U.S. PATENT DOCUMENTS

| 4,151,562 | 4/1979 | Tregay | 358/263 |
|---|---|---|---|
| 4,278,999 | 7/1981 | Ganguly et al. | 358/294 |
| 4,288,820 | 9/1981 | Minamibayashi et al. | 358/294 |
| 4,433,346 | 2/1984 | Stoffel | 358/280 |
| 4,494,152 | 1/1985 | Kurata et al. | 358/293 |
| 4,553,172 | 11/1985 | Yamada et al. | 358/280 |
| 4,555,733 | 11/1985 | Garcia | 358/285 |
| 4,556,901 | 12/1985 | Sakamoto | 358/285 |
| 4,556,918 | 12/1985 | Yamazaki et al. | 358/280 |
| 4,563,700 | 1/1986 | Sato | 358/280 |

Primary Examiner—Henry C. Yuen
Attorney, Agent, or Firm—Brumbaugh, Graves, Donohue & Raymond

[57] ABSTRACT

Even a color scanner in small-scale system structure includes a storage unit for storing image picture data of at least one scanning line. The present invention provides a method of recording a picture image composed of a pattern and characters on a process film by one scanning step, by employing the picture image storage unit. Namely, a pattern original and a character original are arranged along a main scanning direction on an original drum. Coordinate positions of the respective originals are subjected to input designation while areas to be imposed by the characters included in pattern regions to be duplicated are subjected to input designation. When the original picture is scanned to be read while a duplicate thereof is simultaneously scanned and recorded, the character original is stored in the picture image storage unit, while character signals are read from the image storage unit in character imposing areas when pattern signals are recorded, so that the character signals are replaced by the pattern signals thereby to be recorded.

3 Claims, 5 Drawing Figures

METHOD OF SCANNING AND RECORDING IMAGES

BACKGROUND OF THE INVENTION

1. Field of the Invention

The present invention relates to a method of scanning and recording images for simultaneously duplicating picture images by exposure on the basis of picture signals obtained by photoelectrically scanning an original by a color scanner. More specifically, it relates to a method of compositely recording line images and pictorial images when an original includes gradated pictorial images and line images consisting of characters, figures or the like.

2. Description of the Prior Art

With development of so-called color scanners for efficiently duplicating a large quantity of color original pictures as color-separated halftone images in recent years, color prints have come into wide use with improved productivity in color photomechanical process.

In general, color prints produced in accordance with a desired layout coexistently include line images such as characters and figures and gradated pictorial images.

Conventionally in processing such prints coexistently including the line images and the pictorial images, original film plates have been separately produced such that pictorial images are produced as halftone images simultaneously with color separation performed by a color scanner while line images are produced by photoduplication employing a process camera, whereby the both images are composed with each other through contact exposure.

An apparatus so-called a layout scanner, which has been subjected to practical use in recent years, can directly output and record color separated images to be finally subjected to desired layout by digital processing of picture image signals.

It is well known that, when pictorial images and line images are coexistently present in an original to be duplicated, the pictorial images are processed through selectively setting up reproduction conditions suitable to reproduction of the pictorial images, i.e., halftone images, while the line images are processed by selectively setting up reproduction conditions of high resolution suitable to reproduction of the line images.

For example, in a co-pending U.S. patent application allocated Ser. No. 616,389, areas of pictorial images and those of line images in an original are respectively designated by coordinate values so as to selectively set up reproduction conditions suitable to the respective areas when the position of a scanning point is coincident with the designated coordinate values during scanning of the original picture. However, although such the method as mentioned above may be advantageous in the case where the pictorial image and the line image are separated by relatively simple border lines, designation of the coordinate values is difficult when border lines are complicatedly entangled, leading to impossibility especially in superimposition of characters alone in a pictorial image in practice.

SUMMARY OF THE INVENTION

The present invention is directed to overcome the aforementioned disadvantages, and a principal object thereof is to provide a novel method of composing a line image into a pictorial image by employing the existing apparatuses.

Another object of the present invention is to simplify operation for composing a line image into a pictorial image thereby to reduce the time for producing the composite image in comparison with conventional methods requiring skillfulness and much time.

For attaining the aforementioned objects, the method according to the present invention comprises the steps of: setting coordinate values of both a line image area or areas and a pictorial image area or areas, of an original, through an input unit, said line image area or areas being insertably reproduced in the reproductive pictorial image area or areas reproduced on a photosensitive material; setting coordinate values of both the first reproductive image area or areas, to which said line image area or areas is or are reproduced, and the second reproductive image area or areas, to which said pictorial image area or areas is or are reproduced; storing said coordinate values into the first memory means; photoelectrically scanning said original in such a manner as respectively adaptable to pictorial image and line image; separately processing image data, which are obtained by said scanning, of respective line image and pictorial image; storing processed image data of line image into the second memory means, according to said coordinate values stored in said first memory means; controllably reading out said image data of line image stored in said second memory means according to said coordinate values; and alternatively outputting image data either of line image or pictorial image according to said coordinate values previously stored, whereby reproductive line image or images being insertably reproduced in reproductive pictorial image or images at the predetermined arrangement.

More preferably, in color separation of an original of pictorial images (hereinafter defined as pictorial area) by a color scanner, another original of line images (hereinafter defined as line area) consisting of characters, lines and the like is previously arranged in the main scanning direction relative to the pictorial area, so that the line area is scanned and picked up in high resolution to be stored in an image storage unit, thereby to be outputted in a position deviated by a required distance in the main scanning direction, i.e., in a pictorial image, whereby a line image of high fidelity is compositely recorded in the pictorial image of a color-separated halftone image during single color-separating operation with a desired layout. In the aforementioned manner, the line image can simply be inserted in the pictorial image by merely arranging a plurality of original images to be composed along the main scanning direction. Or, in modification thereof, the pictorial image can be inserted in the line image, or line images or pictorial images can be composed with each other respectively.

According to the present invention, the operation for inserting line images such as characters in patterns, which has generally required skillfulness accompanying complicatedness, can be carried out by simple operation of setting up coordinate values of an area or areas of line image in an original and those of an area or areas in a picture image or picture images to be reproduced within which the line image is insertably recorded. Since the image composition is performed during the process of color separation, the time for the whole processing works can be greatly reduced, leading to remarkable improvement in efficiency.

According to the present invention, since a memory means-having capacity of image data corresponding to at least one scanning line relative to an original is generally provided in conventional scanners for making number of color-separation and reproduction magnification variable, only a few additional control means can implement high-quality reproduction with composing functions, by utilizing the memory means, thereby increase of cost for an apparatus can be suppressed. Further, areas to be reproduced in an original and those to be recorded in a photosensitive material are respectively inputted as coordinate values, since reproduction can be made under identical conditions, thereby to stabilize the resultant quality.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 2A:
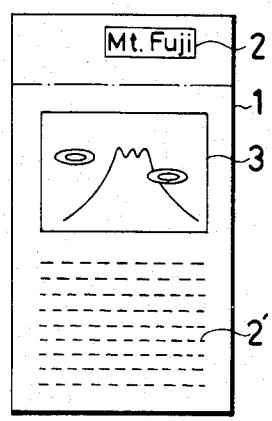
FIG. 2a is a schematic plan view of an original, in which a line area and a pictorial area are vertically arranged relative to the original.
Figure 2C:
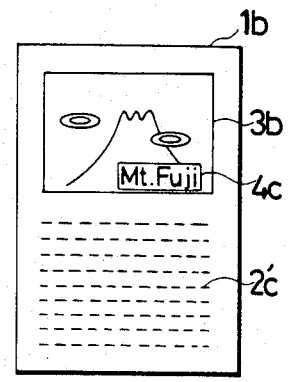
FIGS. 2b and 2c are schematic plan views respectively showing resultant reproduction images recorded on a photosensitive material.
Figure 2B:
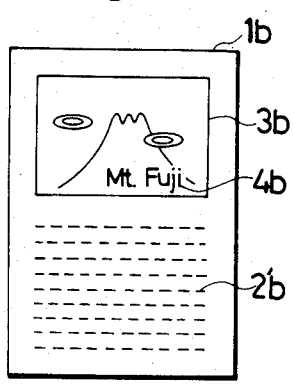

Referring to FIG. 2a, line areas 2 and 2' are respectively arranged in such a manner as they are vertically aligned relative to a pictorial area 3 in an original 1, and referring to FIGS. 2b and 2c, which are respectively resultant images compositely reproduced from the original shown in FIG. 2a, reproductive line areas 4b and 4c are respectively inserted in a reproductive pictorial area 3b on a photosensitive material 1b. Respective reproductive line areas 2'b and 2'c are recorded at the same position relative to the pictorial area 3b.

Figure 3:
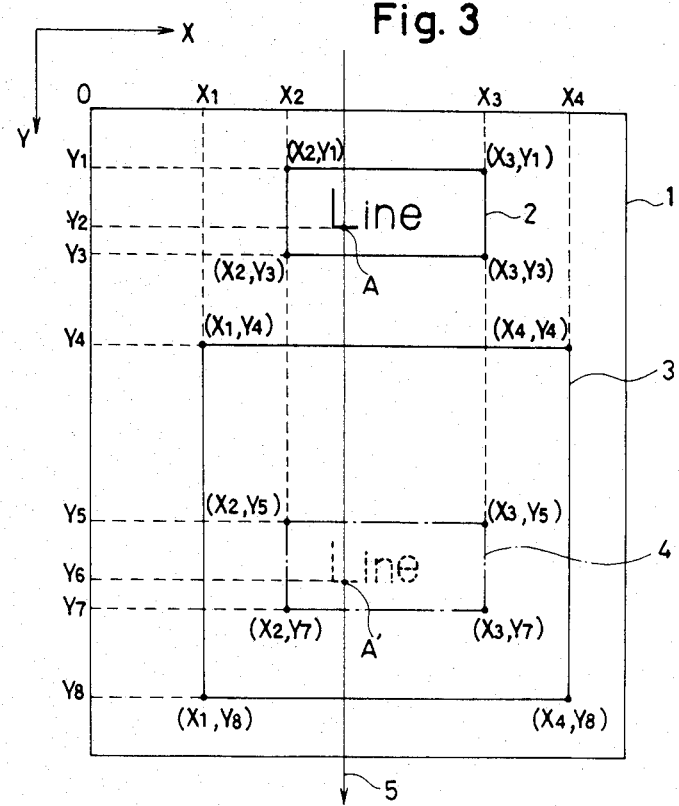
FIG. 3 is an illustrative view for explaining an embodiment according to the present invention.

It is assumed here, for convenience of illustration, that the original 1 to be reproduced includes one line area 2 and one pictorial area 3 to be composed with each other, which are in the form of rectangles having sides parallel to the main scanning direction (axis Y in FIG. 3) and the sub-scanning direction (axis X in FIG. 3). It is to be noted that in an embodiment described hereunder the original 1 further includes the line area 2' which are not composed with the pictorial area 3, and the reproduction is made in actual size without any enlargement nor reduction. This serves only clarification for illustrating the present invention, and thus, needless to say, the scope of the invention should not be defined to such an embodiment.

In FIG. 3, the line area 2 is shown in the form of a rectangle defined by four points indicated by coordinate values $(X_2, Y_1)$, $(X_3, Y_1)$, $(X_2, Y_3)$ and $(X_3, Y_3)$ and the pictorial area 3 is shown in the form of a rectangle defined by four points indicated by coordinate values $(X_1, Y_4)$, $(X_4, Y_4)$, $(X_1, Y_8)$ and $(X_4, Y_8)$. A rectangle 4 shown by dashed lines, which is defined by coordinate values $(X_2, Y_5)$, image $(X_3, Y_5)$, $(X_2, Y_7)$ and $(X_3, Y_7)$, an imaginary area into which a resultant line corresponding to the original line image 2 is compositely inserted. Reference numeral 5 indicates a main scanning line relative to the original 1. A point denoted by A is a picture element of the line image when the original 1 is scanned along the main scanning line 5, and on the other hand a point denoted by A' is an imaginary picture element to be compositely recorded on a photosensitive material, which is recorded during the original line image is scanned. When the picture element A' is outputted at a position $(Y_2-Y_1)=(Y_6-Y_5)$, i.e., at a position downwardly separated from the upper end of the imaginary area 4 to be inserted in the pictorial area 3 by a distance corresponding to that from the upper end of the original line area 2 to the picture element A', the line image is compositely inserted into the designated area 4 within the pictorial image, whereby the line image 2 is compositely recorded together with the pictorial image.

Figure 1:
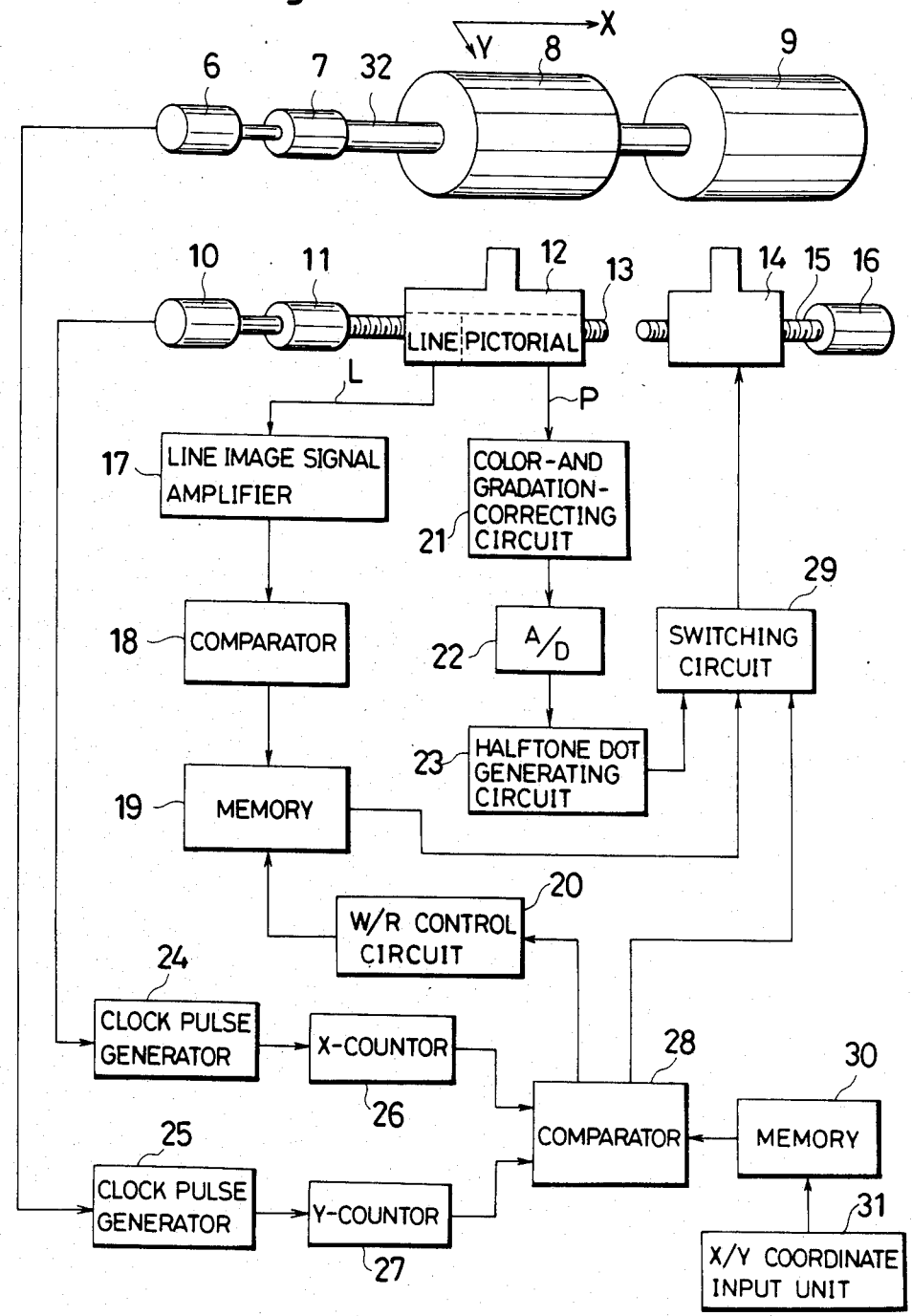
FIG. 1 is a block schematic diagram of a color scanner by which the present invention is implemented.

FIG. 1 is a block schematic diagram of a color scanner to be employed for carrying out the method according to the present invention. The color scanner comprises an original drum 8 and a recording drum 9 which are connected with each other through a rotary shaft 32, to be rotated by a motor 7. A rotary encoder 6 is driven coaxially or synchronously with the drums 8 and 9 and generates clock pulses in synchronization with rotation of the drums 8 and 9. The original 1 as shown in FIG. 2a including the line image area 2 and the pictorial image area 3 is loaded on the original drum 8, while a photosensitive material such as a photographic film is loaded on the recording drum 9.

A scanning head 12 is provided opposite to the original drum 8, to be moved along the axis of the original drum 8 by a feed screw 13 which is driven by a motor 11. A fine light spot is projected from a light source (not shown) onto the original so that the reflected or transmitted light from the original 1 is received by scanning head 12, thereby to obtain image data of line signals and pictorial image signals. The term "line image signal" herein used indicates an output signal L from high-resolution photosensors provided in the head 12 and adapted to scan the line image, while the term "pictorial image signal" indicates an output signal P from a normal pictorial photosensor provided also in the head 12 and adapted to scan the pictorial image. The pick-up head 12 comprising the said two kinds of photosensors may be prepared by that disclosed in the aforementioned co-pending U.S. patent application allocated Ser. No. 616,389.

Another rotary encoder 10 is driven coaxially or synchronously with the feed screw 13 to generate clock pulses in synchronization with movement of the head 12.

On the other hand, an exposure head 14 for recording is arranged in the vicinity of the recording drum 9, to be moved along the axis of the recording drum 9 by a feed screw 15 which is driven by a motor 16. The exposure head 14 receives the picture signals for recording, so as to expose and record prescribed duplicate images on the sensitive material wound around the recording drum 9. Such drum, head, driving mechanism and the like may be structured in accordance with a well-known process color scanner, and hence detailed description thereof is herein omitted.

A line image signal L photoelectrically converted by the scanning head 12 is amplified in an amplifier 17 and thereafter converted into a binary signal by a comparator 18, to be inputted in a memory 19 having capacity of at least one scanning line of the original 1, the output of which is controllably inputted in a switching circuit 29.

On the other hand, a pictorial image signal P photoelectrically converted by the scanning head 12 is inputted in a color- and gradation-correcting circuit 21 to be subjected to prescribed correction and thereafter subjected to analog-to-digital conversion in an A/D converter 22, to be transferred to a halftone dot generator circuit 23, the output of which is in turn inputted in the switching circuit 29.

The switching circuit 29 selectively leads the signal P subjected to the aforementioned prescribed processing when the pictorial image of the pictorial area 3 is recorded while leading the signal L subjected to the aforementioned prescribed processing when the line image of the line image area 2 is recorded in the predetermined area 4, thereby to transmit the same to the exposure head 14.

Both the outputs from the memory 19 and the halftone dot generator circuit 23 are respectively inputted in the switching circuit 29, in which the former is controlled by a write-and-read control circuit 20.

The switching circuit 29 and the W/R control circuit 20 are controlled in the following manner:

Pulses generated by the rotary encoder 10 provided to the driving shaft of the pick-up head 12 in response to the amount of movement of the pick-up head 12 in the sub-scanning direction (i.e. in the X-direction as shown in FIG. 1) are converted into clock pulses of predetermined pitches by a clock pulse generator 24, while pulses generated by the rotary encoder 6 provided to the rotary shaft of the original drum 8 in response to the volume of rotation of the drum 8 are converted in a similar manner by a clock pulse generator 25. These two kinds of clock pulses are inputted in an X-counter 26 and a Y-counter 27 respectively.

Then the X-counter 26 counts the clock pulses in the number proportional to the amount of movement of the pick-up head 12 along the sub-scanning direction taking the beginning end (e.g., left end) of the moving stroke of the pick-up head 12 as a zero point, while the Y-counter 27 counts the clock pulses in the number proportional to the angle of rotation of the original drum 8 taking a reference point (e.g., the upper edge of the original picture 1) on the original drum 8 as a zero point.

On the other hand, coordinate values of the line area 2 and the pictorial area 3 of the original 1 and those of the reproductive line area 4 which is inserted into the reproductive pictorial area on the photosensitive material 1b, together with instructions for switching over input/output in respect of the signals L and P at the respective coordinate positions are respectively inputted into a memory 30 by an X/Y coordinate input unit 31, from which outputs are inputted in a comparator 28.

The counted values in respective counters 26 and 27 are respectively outputted to the comparator 28 where the values are compared with the aforementioned preset values stored in the memory 30, so as to, upon coincidence of the counter values, output control signals to the W/R control circuit 20 and the switching circuit 29 according to required control modes.

The W/R control circuit 20 controls writing into and reading from the memory 19 in response to the aforementioned control signals. Namely, the W/R control circuit 20 controls to write scanning data of the line area 2 into the memory 19 during the line area 2 is photoelectrically scanned, and it controls to read the scanning data therefrom during the exposure head 14 is scanned the predetermined reproductive area 4, to which the line image is reproductively inserted, on the photosensitive material 1b.

The switching circuit 29 is controlled by the aforementioned control signals and output signals from the memory 19. Namely, the switching circuit 29 does not output when the aforementioned control signals indicate that the exposure onto the photosensitive material 1b is done outside the predetermined reproductive pictorial area 3, and, on the other hand, the switching circuit 29 outputs the pictorial image signals which are transmitted from the halftone dot generator circuit 23 when the control signals indicate that the exposure is done within the predetermined reproductive pictorial area, in this case when the line image signals are inputted from the memory 19, the output of pictorial image signals is deterred to output only the line image signals, whereby the line image is reproductively inserted into the reproductive pictorial image at the predetermined location.

In the example of the main scanning line 5 as shown in FIG. 3, the line image signals L are written in the memory 19 when a value counted by the Y-counter 27 is between the values of "$Y_1$" and "$Y_3$", i.e. when a value of the Y-counter is "$Y_2$", a point A of the line image is written in the same. When a value counted by the Y-counter 27 is between the values of "$Y_4$" and "$Y_8$", the switching circuit 29 outputs the pictorial image signals P, and the line image signals stored in the memory 19 are read when a value counted by Y-counter 27 is between the values of "$Y_5$" and "$Y_7$", while, when the value counted reaches a value "$Y_6$" in which the difference between the values of "$Y_1$" and "$Y_2$" corresponds to the difference between the values of "$Y_5$" and "$Y_6$", the memory 19 outputs the line image signals of the point A to the switching circuit 29. At this time, the switching circuit 29 outputs the line image signal L in place of the pictorial image signal P, whereby the pixel A' is recorded.

In the case that such a reproduction as shown in FIG. 2b is performed, in which only line image 4b is insertably reproduced within a pictorial image 3b, line image signals are outputted from the switching circuit 29, and when signals of background of line image are inputted to the switching circuit 29, they are deterred to output the pictorial image signals from the generator circuit 23.

On the other hand, in the case that such a reproduction as shown in FIG. 2c is performed, in which line image with a white background 4c is insertably reproduced within a pictorial image 3b, line image signals including those of the background are outputted from the switching circuit 29 during the predetermined reproductive area of the photosensitive material 1b is exposed.

According to the aforementioned structure, the reproductive image to be recorded on the photosensitive material and recorded can be recorded as color-separated halftone images with a line image insertably arranged within a pictorial image.

Although both the memory 19 and the W/R control circuit 20 are provided in the processing line for processing the line image signals L in the embodiment as shown in FIG. 1, they may be provided in the processing line for processing the pictorial image signals P, and may, further, be provided in the both lines.

As shown in FIG. 2, the signals from the other line image area 2' may be simply passed through the memory 19.

From the X/Y coordinate input unit 31 it is possible to input an instruction which orders which signal of the line image and the pictorial image is precedently outputted to the switching circuit 29.

In the aforementioned embodiment, only for simplification of explanation, one original line image and one original pictorial image are respectively arranged on the original. However, it will be apparently understood that the present invention is not restricted to it.

Further, even if the recording position on a photosensitive material is slightly deviated in the subscanning direction relative to an original, correction in alignment can be easily performed by employing a substitute memory having capacity of a plurality of scanning lines. Namely, positional data is inputted into the memory 19 from the memory 30, via W/R control circuit 20, whereby the line image data, which is obtained by scanning an original, of several scanning lines is stored in the memory 19, then the data stored is read out therefrom at the time when the recording point on a photosensitive material reaches the predetermined point previously inputted in the memory 30.

When the pictorial image and the line image are respectively reproduced at different magnifications, it will be easily performed by using a memory having capacity of a plurality of scanning lines and by applying the technique disclosed in a co-pending U.S. patent application allocated Ser. No. 561,745.

The color of the line image can be arbitrarily selected when reproduction thereof is performed only in a specific color.

The method according to the present invention may be applied not only to the drum-type scanner as shown in FIG. 1 but to a so-called flying spot type scanning apparatus. Further, the present invention may also be applied to scanning operation of input by multisensor and output by multibeam employing an image storage unit having storage capacity of a plurality of scanning lines.

What is claimed is:

1. The method of reproducing a combined image scene which includes both line image and pictorial image portions which comprises forming a first image scene in which the line image portion to be combined is separate from the pictorial image portion with which it is to be combined in the combined image scene, deriving the coordinates of the pixels forming the boundaries of the line image portion and of the pictorial image portion in the combined image scene and storing said coordinates in a first memory, scanning the first image scene pixel by pixel for deriving a signal which is a measure of the intensity level of each pixel and comparing the coordinates of each pixel scanned with the coordinates stored in the first memory, supplying reproducing means with input signals for reproducing the combined image scene in synchronism with the scanning of the first image scene, storing in a second memory the derived signal of each pixel included within the boundaries of the line image portion whose coordinates are stored in the first memory, while transmitting to the reproducing means the signals of each pixel whose coordinates are outside the boundaries of the line image portion whose coordinates are stored in the first memory, and transmitting to the reproducing means the corresponding signal stored in the second memory when the pixel scanned in the first image scene corresponds to a pixel included within the boundaries of the line image whose coordinates are stored in the first memory means.

2. A method of scanning and recording images in accordance with claim 1, wherein either line image or pictorial image is selectively reproduced by switchover means when a coordinate value of a scanning point relative to the original coincides with that of a recording point previously stored in the second memory means, said scanning point and recording point being respectively measured by respective pulse-counting means.

3. A method of scanning and recording images in accordance with claim 1, wherein line image and pictorial image portions of the original are arranged to align along a main scanning direction.

* * * * *